United States Patent
Bureau et al.

(10) Patent No.: US 12,440,832 B2
(45) Date of Patent: Oct. 14, 2025

(54) LIQUID PHASE REMOVAL OF TRACE OF IODIDE FROM AN ORGANIC MEDIA USING TERTIARY AMINE ION EXCHANGE ADSORBENT

(71) Applicant: ENERKEM INC., Montreal (CA)

(72) Inventors: Charles Bureau, Monteal (CA); Boris Valsecchi, Montreal (CA); Jean-Philippe Ross, Montreal (CA)

(73) Assignee: ENERKEM INC., Montreal (CA)

( * ) Notice: Subject to any disclaimer, the term of this patent is extended or adjusted under 35 U.S.C. 154(b) by 821 days.

(21) Appl. No.: 17/764,683

(22) PCT Filed: Oct. 1, 2020

(86) PCT No.: PCT/CA2020/051314
§ 371 (c)(1),
(2) Date: Mar. 29, 2022

(87) PCT Pub. No.: WO2021/062544
PCT Pub. Date: Apr. 8, 2021

(65) Prior Publication Data
US 2022/0355287 A1   Nov. 10, 2022

Related U.S. Application Data

(60) Provisional application No. 62/909,292, filed on Oct. 2, 2019.

(51) Int. Cl.
*B01J 41/07* (2017.01)
*B01J 41/14* (2006.01)

(52) U.S. Cl.
CPC ............... *B01J 41/07* (2017.01); *B01J 41/14* (2013.01)

(58) Field of Classification Search
CPC .................................. B01J 41/07; B01J 41/14
See application file for complete search history.

(56) References Cited

U.S. PATENT DOCUMENTS

| | | | |
|---|---|---|---|
| 4,615,806 A | 10/1986 | Hilton | |
| 5,416,237 A | 5/1995 | Aubigne et al. | |
| 5,817,449 A * | 10/1998 | Nakamura | G03C 7/44 430/398 |

FOREIGN PATENT DOCUMENTS

| | | |
|---|---|---|
| EP | 0482787 | 4/1992 |
| GB | 2112394 | 7/1983 |
| WO | 02062740 | 8/2002 |

* cited by examiner

*Primary Examiner* — Bradley R Spies
(74) *Attorney, Agent, or Firm* — Norton Rose Fulbirght Canada

(57) ABSTRACT

It is provided a process of removing iodides from an non-aqueous organic media comprising providing a weak base anion exchange adsorbent; and passing the organic media containing iodides through the adsorbent thereby removing the iodide from said organic media.

16 Claims, 1 Drawing Sheet

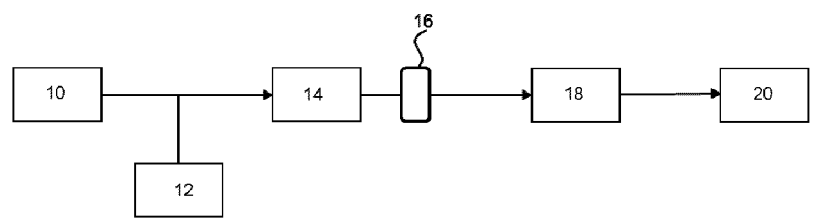

LIQUID PHASE REMOVAL OF TRACE OF IODIDE FROM AN ORGANIC MEDIA USING TERTIARY AMINE ION EXCHANGE ADSORBENT

CROSS-REFERENCE TO RELATED APPLICATIONS

The present application is a U.S. National Phase of International Application No. PCT/CA2020/051314, filed on Oct. 1, 2020, and claims benefit of U.S. Provisional Application No. 62/909,292 filed Oct. 2, 2019, the content of which is herewith incorporated in its entirety.

TECHNICAL FIELD

It is provided the use of a tertiary amine ion exchange adsorbent to remove iodide contaminants from an organic media in liquid phase.

BACKGROUND

Carbonylation of methanol to methyl acetate and acetic acid is an established process and one of the major industrial process originating from the rhodium-catalyzed process known as the Monsanto process.

In U.S. Pat. No. 8,436,215, a process of converting methanol to ethanol is described wherein syngas is first produced, converted to methanol which is then reacted with carbon monoxide in a carbonylation reactor producing methyl acetate, acetic acid and water.

The reaction of methanol and carbon monoxide is a carbonylation reaction, which creates a carbon-carbon bond and which is effected in the presence of a catalyst. The carbonylation catalyst is generally comprised of two components, a reactive complex, generally a soluble rhodium complex, and a promoter which is mainly iodide. A wide variety of rhodium compounds and iodine compounds have been found to give similar reaction rates and product distribution. Strategies to improve catalyst performance in industrial processes have been developed, resulting in for example rhodium- and iridium-catalyzed systems that operate with high activity at reduced water concentration, making product purification less costly.

However, after the carbonylation reaction, it is known that small amounts of iodide impurities remain, which is a known problem associated with the use of such catalysts. Such impurities are poison to many catalysts and for downstream processes such as for example in processes wherein copper based catalyst are used to stimulate the hydrogenolysis reaction producing ethanol.

Several methods have been described for removing iodide impurities from acetic acid and/or acetic anhydride for example. Iodine/iodide removal on ion exchange adsorbents is usually performed on silver (or some other metals)-exchanged strong acid adsorbent for low iodide concentrations of 100 ppb or such from organic media such as acetic acid (see U.S. Pat. No. 5,344,976).

Iodine and iodide compound removal from aqueous media has also been accomplished using ion exchange adsorbents still containing silver or any other iodine-reactive metals, using quaternary amine type adsorbents (U.S. Pat. Nos. 5,624,567 and 7,588,690).

The use of such ion exchange adsorbent as described in the art needs high operation temperatures. Furthermore, typically, multiple columns or guard beds containing the adsorbents are used in succession to ensure removal of iodide impurities.

Silver based catalyst/adsorbents are limited by the strong bonding between the iodide compound and the exchanged silver atom making any regeneration of the catalyst unsustainable at large scale. Silver adsorbent cost is also a limiting factor as the price of silver is at a high point.

There is thus still a need for improved methods and means to remove iodide impurities following carbonylation processes.

SUMMARY

One aim of the present disclosure is to provide a process of removing iodide compounds from an organic media comprising providing at least one weak base anion exchange adsorbent; and passing the organic media containing iodide through the at least one adsorbent thereby removing the iodide from said organic media.

In an embodiment, the iodide compounds are HI, $CH_3I$ and/or $C_6H_{13}I$, $C_{10}H_{21}I$ or a combination thereof.

In a further embodiment, the iodide compounds are $CH_3I$.

In an embodiment, the organic media is a liquid media, a gaz, a fluid or a combination thereof.

In an embodiment, the organic media comprises methyl acetate.

In another embodiment, the organic media comprises methanol, ethyl acetate, ethylpropionate, methyl acetate, isopropyl acetate, n-propyl acetate, n-butyl acetate or a mixture thereof.

In another embodiment, the organic media comprises less than 10 % wt water. In an embodiment, the organic media comprises less than 5 % w of water. In another embodiment, the organic media comprises less than 1 % w of water. In another embodiment, the organic media comprises less than 1000 ppmw of water. In another embodiment, the organic media comprises less than 500 ppmw of water.

In an embodiment, the weak base anion exchange adsorbent is a adsorbent with primary amines, secondary amines and/or tertiary amines functional groups.

In another embodiment, the weak base anion exchange adsorbent comprises the following structure:

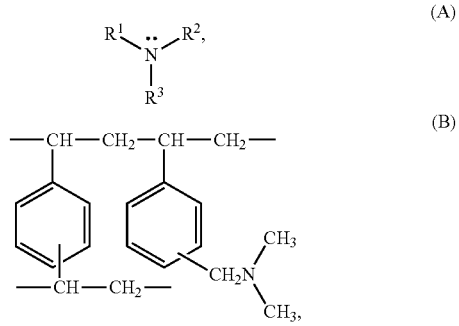

wherein $R^1$ is a backbone. In an embodiment, $R^2$ and $R^3$ are H, $CH_3$, any R or a combination thereof.

In a further embodiment, the backbone is a polymer structure.

In a further embodiment, the weak base anion exchange adsorbent has a polystyrene crosslinked divinylbenzene back bone (polymer structure).

In a further embodiment, the weak base anion exchange adsorbent has a capacity of up to 2.0 equivalent/L.

In an embodiment, the weak base anion exchange adsorbent has a capacity of 1.30 equivalent/L.

In another embodiment, the weak base anion exchange adsorbent is PUROLITE® A100 adsorbent or an equivalent adsorbent.

In another embodiment, the weak base anion exchange adsorbent is a adsorbent with functionalized tertiary amines In another embodiment, the weak base anion exchange adsorbent is a PUROLITE® A100PLUS, PUROLITE® A110, PUROLITE® A100S, PUROLITE® A120 S, Amberlite™ IRA96, and Amberlite™ HPR9700, but not limited to, since any adsorbent or solid substrate with such amine functional groups would be effective at removal of such organic iodide.

In another embodiment, the organic media passes through the adsorbent at a temperature up to the maximum adsorbent allowable operating temperature (adsorbent integrity limit).

In another embodiment, the organic media passes through the adsorbent at a temperature of more or less than 60° C., preferably of less than about 50° C., more preferably of less than about 40° C., but not limited to.

BRIEF DESCRIPTION OF THE DRAWINGS

Reference will now be made to the accompanying drawings.

FIG. 1 illustrates a schematic representation of a process of converting methanol into ethanol wherein the tertiary amine ion exchange adsorbent described herein is used to remove iodide contaminants in accordance to one embodiment.

DETAILED DESCRIPTION

It is provided a mean to remove iodide from an organic media using a tertiary amine ion exchange adsorbent. It is thus provided the use of a tertiary amine ion exchange adsorbent to remove iodide contaminants from an organic media following a carbonylation process.

In an embodiment, the organic media is in a gas phase and/or liquid phase, preferably liquid phase.

In an embodiment, the organic media is constituted of methyl acetate. Also encompassed are organic media comprising methanol, ethanol, ethyl acetate or other esters, which may include, but are not limited to, ethylpropionate, methyl acetate, isopropyl acetate, n-propyl acetate, n-butyl acetate or mixtures thereof.

As encompassed herein, iodide contaminants are generally alkyl iodides such as methyl iodide.

As illustrated in FIG. 1, an organic media containing methanol 10 and a carbon monoxide source 12, such as residual carbon monoxide from a syngas, are reacted 14 in a reactor (or carbonylation reactor) in the presence of a catalyst consisting essentially of rhodium or rhodium supported on a support of carbon or alumina for example, to produce methyl acetate and acetic acid. The produced methyl acetate is then distilled and purified, but traces of iodide contaminants may remain. The distilled methyl acetate is then passed through a guard bed 16, such as for example but not limited to in liquid phase, comprising the tertiary amine ion exchange adsorbent described herein in order to remove all traces of iodide contaminants before being hydrogenated 18 to produce ethanol 20. The liquid is preferably passed through at a predetermine rate. Feed rates are dependent on for example the amount of iodide impurity, the degree of purification required, the temperature, and the liquid feed. In an embodiment, the feed rate is between 0.5 to 50 bed volumes per hour.

Accordingly, in liquid phase, the impure methyl acetate/methanol stream can be passed through a bed of weak base anion exchange adsorbent as described herein. As known in the art, copper based catalysts are generally used to stimulate the hydrogenolysis reaction and such catalysts are sensitive to halogen (including organic and inorganic iodide). Thus removal of iodide contaminants as proposed herein allows to maximize the performance of copper catalysts during downstream hydrogenolysis reaction.

A weak base anion exchange adsorbent or tertiary amine adsorbent as encompassed herein is intended to mean a weakly basic adsorbent which has tertiary amine functional groups consisting generally of formula (A):

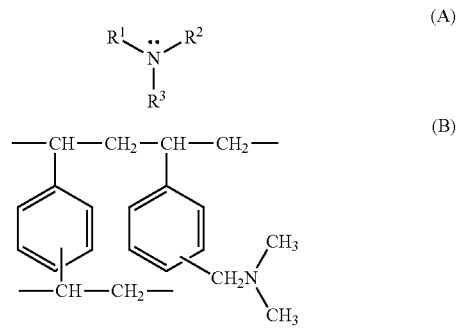

wherein:

$R^1$: is the polystyrene crosslinked divinylbenzene back bone (polymer structure) of the adsorbent (as shown in B), or any other back bone that can link amine functional groups.

$R^2$ and $R^3$ can be any R (but more typically $CH_3$), but also H (i.e. secondary or primary amine groups).

The following generic reaction represents the chemical adsorption of the contaminant organic iodide (halogenoalkane or other organic halide) onto the amine functional group, where $R^4$ is the $CH_3$ (methyl) and X is the iodide (I), for the preferred specific case of methyl iodide ($CH_3I$). $R^4$ is reacted (attached) to the amine functional group, making it a quaternary amine strong base. The new strong base function strongly link the iodide anion (I−) to the adsorbent, preventing it from being released back to the organic media.

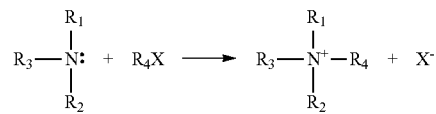

In an embodiment, the tertiary amine adsorbent as encompassed herein is a polystyrene crosslinked divinylbenzene tertiary amine adsorbent such as the PUROLITE® A100 or an equivalent, containing for example a capacity of 1.30 equivalent/L. Alternatively, also encompassed herein are adsorbents functionalized with tertiary amines known such as PUROLITE® A100PLUS, PUROLITE® A110, PUROLITE® A100S, PUROLITE® A120 S, Amberlite™ IRA96, and Amberlite™ HPR9700, but not limited to, since any adsorbent or solid substrate with such amine group would be effective at removal of such organic iodide.

Impure methyl acetate liquid stream is containing from up to 150 ppm, preferably from 15-to 150 ppm, of total iodide mainly considered to be organic iodides is to be treated to remove the iodide down to about 1 ppm or less. As encompassed herein, the iodide contaminate or impurity concentration is defined as the concentration of any molecular species containing iodide. For example, such species are HI, $CH_3I$ and/or $C_6H_{13}I$, $C_{10}H_{21}I$. In a particular embodiment, such species is $CH_3I$. More particularly, the method described herein can be used to remove the concentration of one or more $C_1$-$C_{12}$ alkyl iodide, and more particularly one or more $C_1$-$C_8$ alkyl iodides, with increasing adsorption efficiency towards lower molecular weight iodide species. The method described herein allows to reduce the concentration of the iodide compounds to less than about 1 ppm up to less than about 500 ppb, when $CH_3I$ is the main form of residual iodide. Accordingly, as demonstrated herein, methyl Iodide is being almost totally removed. When other iodide species are present, the total iodide removal is higher than the methyl iodide removal, and thus the adsorbent described herein can remove other iodides species. Similar adsorption pathway applies to other alkyl iodides.

The liquid stream passes through the tertiary amine adsorbent as encompassed herein at a temperature of operation of for example less than 60° C., preferably of less than 50° C., more preferably at about 40° C., but not limited to.

While the present disclosure has been described in connection with specific embodiments thereof, it will be understood that it is capable of further modifications and this application is intended to cover any variations, uses, or adaptations, including such departures from the present disclosure as come within known or customary practice within the art and as may be applied to the essential features hereinbefore set forth, and as follows in the scope of the appended claims.

What is claimed is:

1. A process of removing $CH_3I$ from an organic media comprising less than 1000 ppmw of water, the process comprising:
   providing at least one weak base anion exchange adsorbent; and
   passing said organic media containing $CH_3I$ through said at least one adsorbent thereby removing the $CH_3I$ from said organic media,
   wherein the weak base anion exchange adsorbent comprises the following structure:

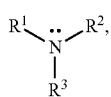
(A)

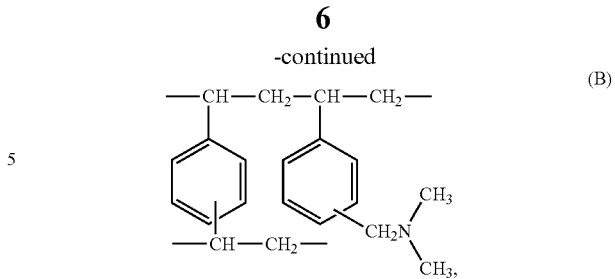

wherein $R^1$ is a backbone; and
wherein the organic media comprises methanol, ethyl acetate, ethylpropionate, methyl acetate, methanol, isopropyl acetate, n-propyl acetate, n-butyl acetate or a mixture thereof.

2. The process of claim 1, wherein the organic media is a liquid media, a gas, a fluid or a combination thereof.

3. The process of claim 1, wherein the organic media comprises methyl acetate.

4. The process of claim 1, wherein said weak base anion exchange adsorbent is a adsorbent with primary amines, secondary amines and/or tertiary amines functional groups.

5. The process of claim 1, wherein $R^2$ and $R^3$ are H, $CH_3$, or a combination thereof.

6. The process of claim 1, wherein the backbone is a polymer structure.

7. The process of claim 1, wherein the back bone is a polystyrene crosslinked divinylbenzene back bone.

8. The process of claim 1, wherein the weak base anion exchange adsorbent has a capacity of up to 2.0 equivalent/L.

9. The process of claim 1, wherein the weak base anion exchange adsorbent has a capacity of 1.30 equivalent/L.

10. The process of claim 1, wherein said organic media passes through said adsorbent at a temperature of greater than 60° C.

11. The process of claim 1, wherein said organic media passes through said adsorbent at a temperature of less than 60° C.

12. The process of claim 1, wherein said organic media passes through said adsorbent at a temperature of less than about 50° C.

13. The process of claim 1, wherein said organic media passes through said adsorbent at a temperature of less than about 40° C.

14. The process of claim 1, further comprising a first step of removing water from the organic media to a content of less than 1000 ppmw of water.

15. The process of claim 1, wherein the organic media comprises methanol and methyl acetate.

16. The process of claims 1 or 2, wherein the organic media is methyl acetate, which contains up to 150 ppm iodide, and the $CH_3I$ is removed to less than 1 ppm.

* * * * *